(12) United States Patent
Rueb

(10) Patent No.: US 10,668,631 B2
(45) Date of Patent: Jun. 2, 2020

(54) COMPENSATING DEVICE FOR A HANDLING UNIT AND HANDLING UNIT COMPRISING THE COMPENSATING DEVICE

(71) Applicant: Robert Bosch GmbH, Stuttgart (DE)

(72) Inventor: Andreas Rueb, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 144 days.

(21) Appl. No.: 15/746,493

(22) PCT Filed: Jun. 8, 2016

(86) PCT No.: PCT/EP2016/062969
§ 371 (c)(1),
(2) Date: Jan. 22, 2018

(87) PCT Pub. No.: WO2017/016727
PCT Pub. Date: Feb. 2, 2017

(65) Prior Publication Data
US 2018/0207811 A1    Jul. 26, 2018

(30) Foreign Application Priority Data

Jul. 24, 2015    (DE) .................. 10 2015 214 003

(51) Int. Cl.
*B25J 17/02*    (2006.01)
*B25J 19/06*    (2006.01)

(52) U.S. Cl.
CPC ....... *B25J 17/0225* (2013.01); *B25J 17/0233* (2013.01); *B25J 19/063* (2013.01)

(58) Field of Classification Search
CPC .. B25J 17/0225; B25J 17/0233; B25J 19/063; B25J 19/008; B25J 19/0016; B25J 17/02; B25J 17/0208

(Continued)

(56) References Cited

U.S. PATENT DOCUMENTS 4,863,206 A * 9/1989 Kaufmann ........... B25J 17/0208
294/86.4
4,954,005 A * 9/1990 Knasel .................. B25J 19/063
403/116

(Continued)

FOREIGN PATENT DOCUMENTS

DE    3004014 A1    8/1981
DE    3640973 A1    6/1988

(Continued)

OTHER PUBLICATIONS

International Search Report dated Sep. 14, 2016 of the corresponding International Application PCT/EP2016/062969 filed Jun. 8, 2016.

*Primary Examiner* — Victor L MacArthur
*Assistant Examiner* — Gregory Robert Weber
(74) *Attorney, Agent, or Firm* — Norton Rose Fulbright US LLP; Gerard Messina

(57) ABSTRACT

A compensating device, which can be placed between a robot, e.g., used to grip and position workpieces, and a gripper moved by the robot to compensate position tolerances, includes respective interfaces for a manipulator and an end effector, with the compensating device positioned between the manipulator and the end effector and including a joint device aligned with a first axis Z between the interface segments, a first joint partner connected to the first interface segment, and a second joint partner connected to the second interface segment, one of the joint partners including a ball segment and the other including, for the ball segment, a receptacle segment that includes at least one ramp region so that the joint device forms a pivot or ball joint, the ball segment being capable of being displaced from a normal position in a transverse direction X-Y to the first axis Z into a compensating position.

9 Claims, 14 Drawing Sheets

(58) Field of Classification Search
USPC ............... 294/67.21, 119.4, 86.4; 74/490.05
See application file for complete search history.

(56) References Cited

U.S. PATENT DOCUMENTS

| | | | | |
|---|---|---|---|---|
| 5,842,962 | A * | 12/1998 | Yamada | B23P 11/025 |
| | | | | 492/18 |
| 5,964,124 | A * | 10/1999 | Nunes | B25J 19/063 |
| | | | | 192/56.32 |
| 6,214,057 | B1 * | 4/2001 | Spencer | B25J 19/063 |
| | | | | 188/151 R |
| 6,333,696 | B1 * | 12/2001 | Matsumiya | B25J 19/063 |
| | | | | 340/679 |
| 6,690,208 | B2 * | 2/2004 | Gloden | B25J 19/063 |
| | | | | 192/150 |
| 8,794,418 | B1 * | 8/2014 | Norton | B25J 17/0208 |
| | | | | 192/150 |
| 2010/0009825 | A1 * | 1/2010 | Norton | B25J 15/04 |
| | | | | 483/58 |

FOREIGN PATENT DOCUMENTS

| | | | |
|---|---|---|---|
| DE | 3641368 A1 | 6/1988 | |
| DE | 296245 A5 | 11/1991 | |
| JP | S59110593 A | 6/1984 | |
| JP | 2001334485 A | * 12/2001 | |
| JP | 2001334485 A | 12/2001 | |
| JP | 2010105098 A | 5/2010 | |

\* cited by examiner

Fig. 2
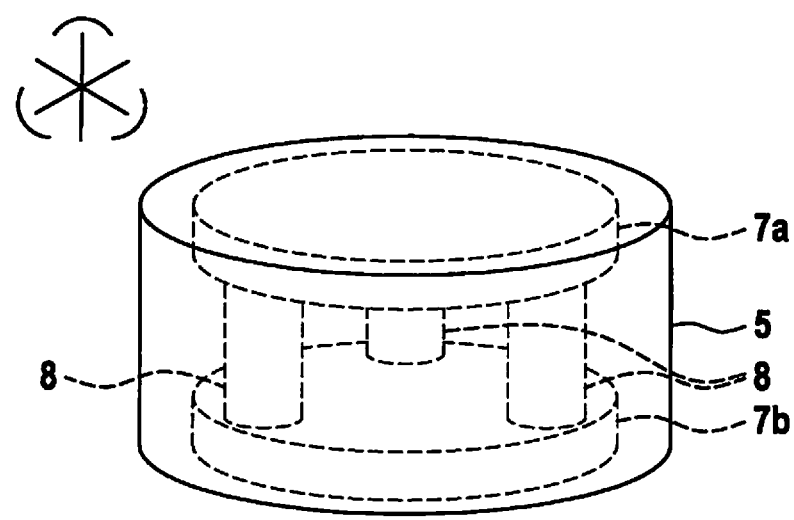
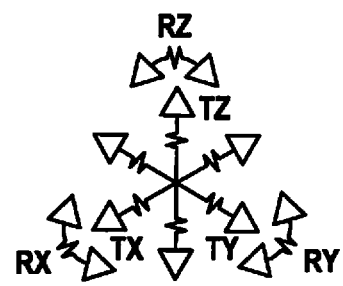

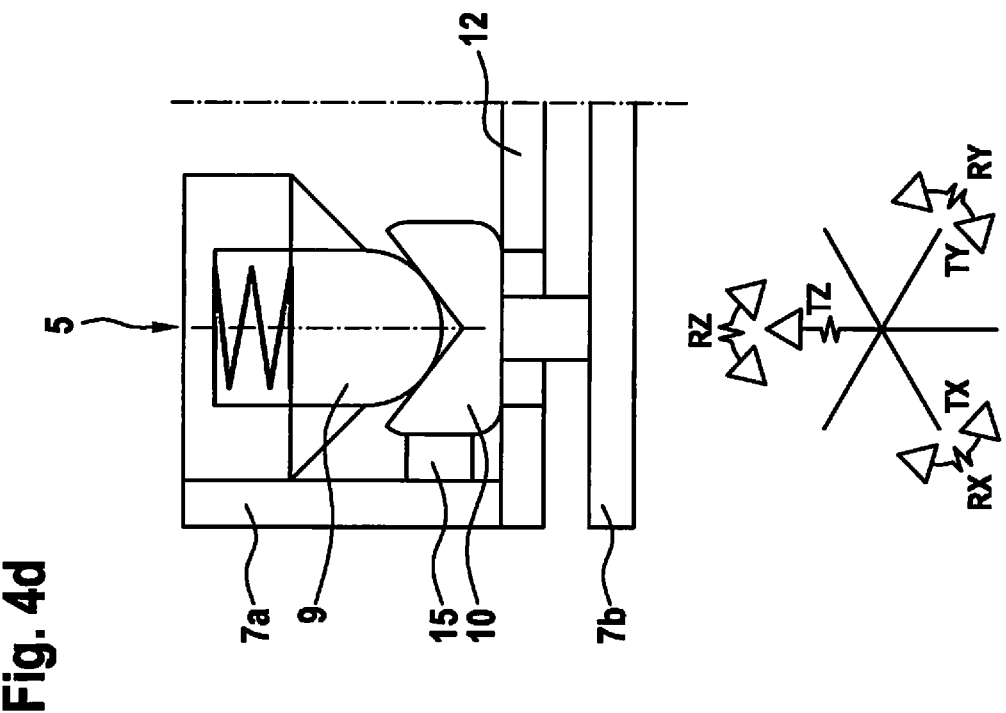
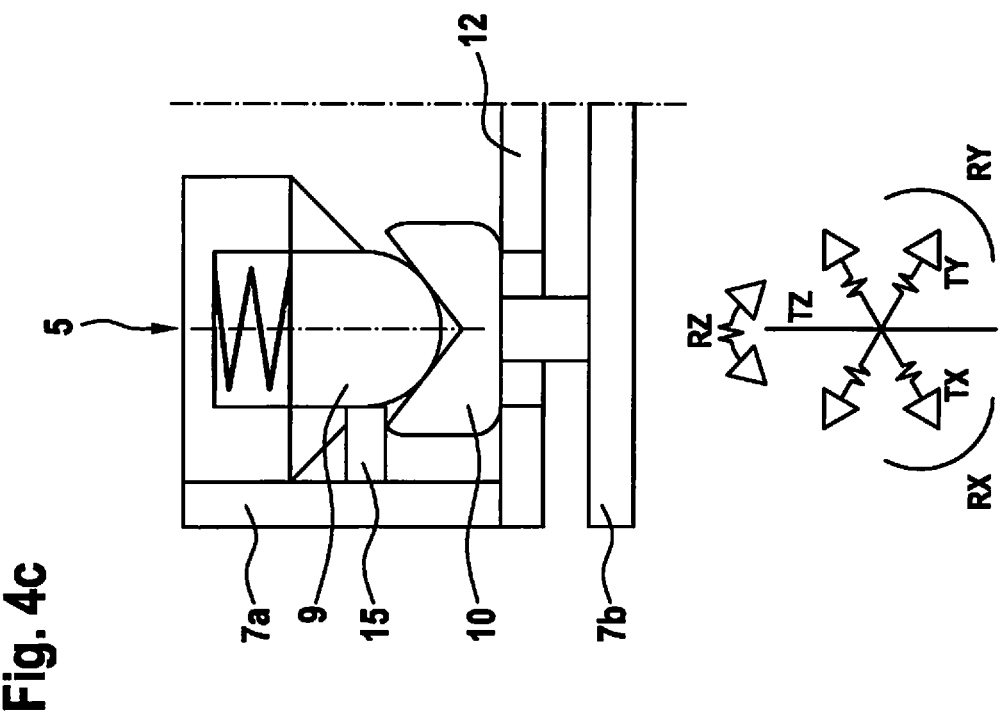

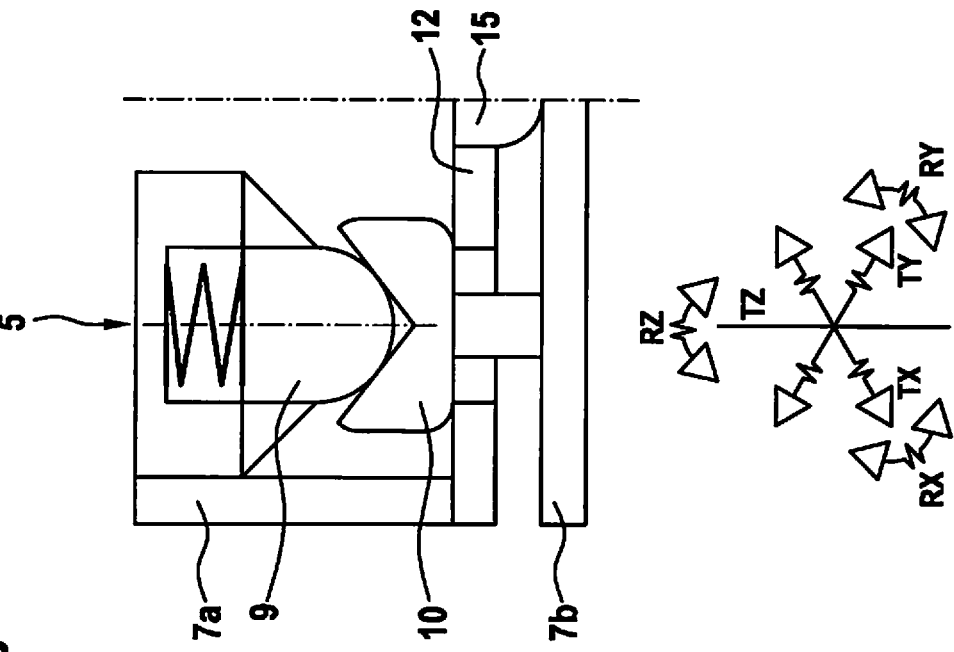
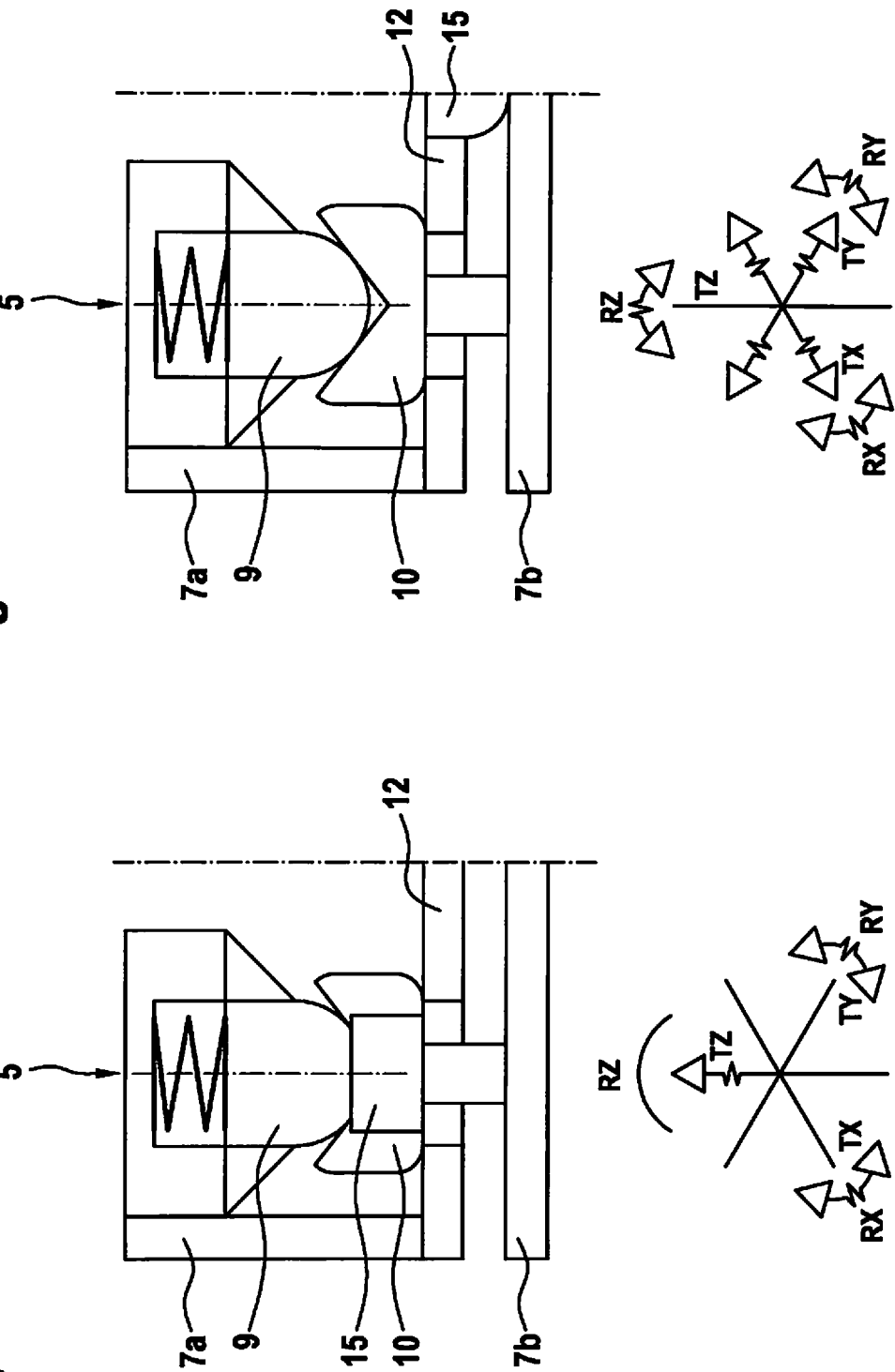

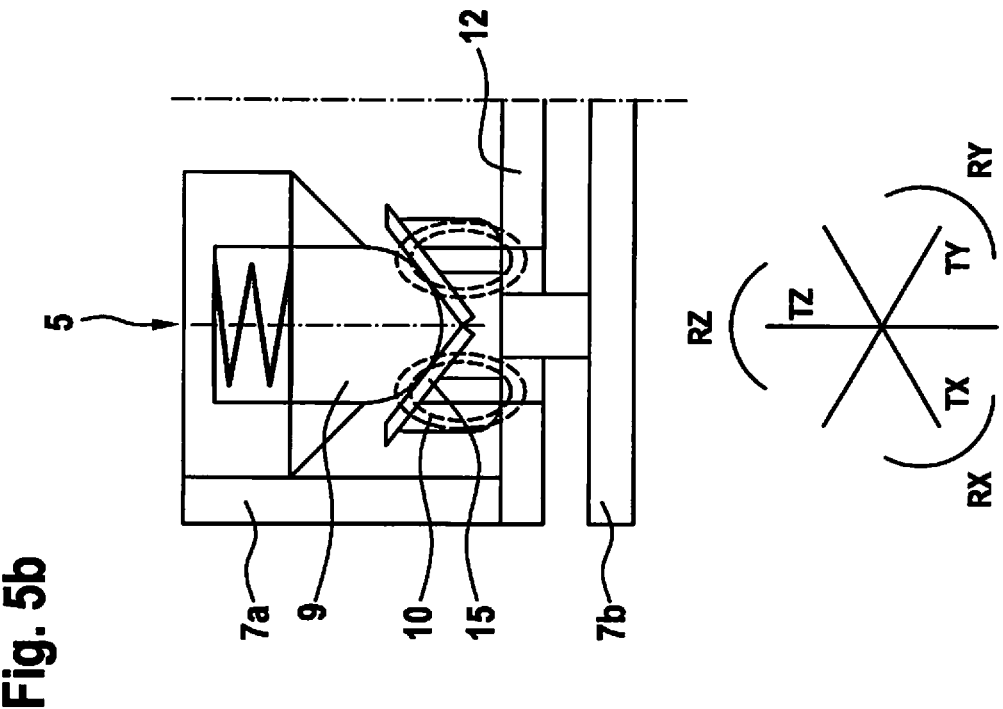
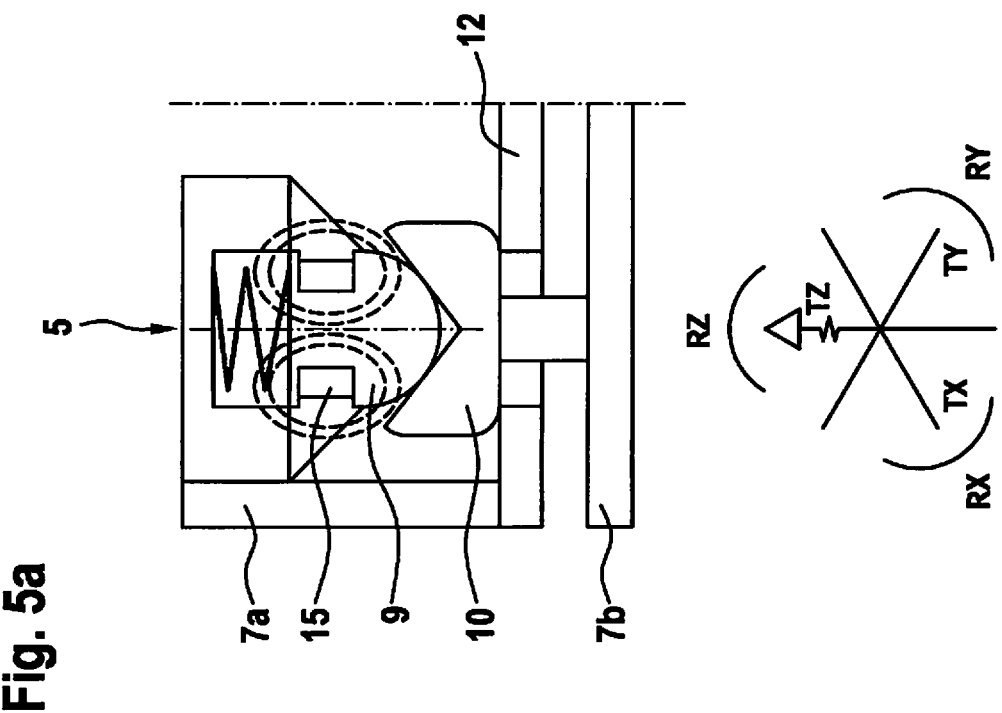

COMPENSATING DEVICE FOR A HANDLING UNIT AND HANDLING UNIT COMPRISING THE COMPENSATING DEVICE

CROSS-REFERENCE TO RELATED APPLICATIONS

The present application is the national stage of International Pat. App. No. PCT/EP2016/062969 filed Jun. 8, 2016, and claims priority under 35 U.S.C. § 119 to DE 10 2015 214 003.2, filed in the Federal Republic of Germany on Jul. 24, 2015, the content of each of which are incorporated herein by reference in their entireties.

FIELD OF THE INVENTION

The present invention relates to a compensating device for a handling device, the compensating device having a first interface segment for a manipulator and a second interface segment for an end effector, so that the compensating device can be situated between the manipulator and the end effector; at least one joint device, the at least one joint device being oriented in alignment with a first axis between the interface segments; and a first and a second joint partner, the first joint partner being connected to the first interface segment and the second joint partner being connected to the second interface segment, and the one joint partner having a ball segment and the other joint partner having a receptacle segment for the ball segment, so that the joint device forms a pivot joint or a ball joint. In addition, the present invention relates to a handling device having the compensating device.

BACKGROUND

In automation technology, robots are frequently used, for example, to grip and to position workpieces. The robots have a very high degree of positioning precision, but during picking up and joining tasks disturbances can occur due to unknown or imprecise positioning of the workpiece. In order to enable compensation of such positional tolerances, compensating devices are known that can be situated between the robot and a gripper moved by the robot. Such compensating devices permit a relative displacement between the gripper and the robot, such that the position tolerances can be compensated by the relative displacement. As a result, the tolerance requirements at the position of the workpiece are simplified by such compensating devices.

DD 296 245 A5 indicates an assembly compensating device that is situated between a robot and a manipulator. The assembly compensating device embodies a sequential design principle, in which various degrees of freedom are enabled via a plurality of bearing points in order to achieve tolerance compensation. Inter alia, the assembly compensating device has a ball joint that enables a tolerance adjustment relating to a pivoting of the gripper relative to an X axis and Y axis of the robot. In addition, a height adjustment in the Z direction, a pivot about the Z direction, and a linear displacement in the X-Y plane are made possible via further bearing points.

SUMMARY

According to an example embodiment of the present invention, a compensating device is suitable and/or fashioned for a handling device, the handling device including a manipulator, such as a robot, in particular a jointed-arm robot, a Cartesian robot, a pick-and-place robot, etc., as well as an end effector, such as a gripper. In an installed state, the compensating device is situated, in particular sequentially, between the manipulator and the end effector. Specifically, the end effector is borne by the manipulator via the compensating device.

The compensating device includes a first interface segment for connection to the manipulator, and a second interface segment for connection to the end effector. For example, the first interface segment can be connected to the manipulator via a quick-release coupling or via a screw connection, and the second interface segment can be connected to the end effector via a quick-release coupling or a screw connection. The interface segments can each also be fashioned as an assembly.

The compensating device enables a relative movement between the first interface segment and the second interface segment in a plurality of degrees of movement freedom. Thus, the end effector can be moved in the plurality of degrees of movement freedom relative to the manipulator, in order to compensate tolerances for example during pickup, positioning, and/or joining tasks. The degrees of movement freedom can be realized as degrees of translational freedom and/or as degrees of rotational freedom.

Regarded functionally, due to the compensating device, the handling device is able to grip a wrongly positioned workpiece or tool with the end effector by changing the position of the end effector relative to the manipulator using the compensating device.

Preferably, the interface segments are lined up sequentially or one after the other in the direction of a first axis. Particularly preferably, the first axis is realized as a Z axis and/or height axis of the manipulator.

The compensating device includes at least one joint device. In a small example embodiment, the compensating device includes exactly one joint device. The at least one joint device is oriented in alignment with or parallel to the first axis.

The joint device includes a first and a second joint partner. The first joint partner is connected to the first interface segment, and the second joint partner is connected to the second interface segment.

In particular, the position of the first interface segment can be modified relative to the second interface segment via the at least one joint device. The interface segments thus form couplings that connect the manipulator and the end effector to the at least one joint device.

The one joint partner includes a ball segment and the other joint partner includes a receptacle segment for the ball segment. The ball segment is particularly preferably spherical in shape. In modified example embodiments, the ball segment can also be realized as a convex free shape. The receptacle segment is functionally fashioned such that the joint device forms a pivot joint or ball joint. Example embodiments of the receptacle segment are described below. The pivot joint permits a pivoting of the first interface segment relative to the second interface segment about at least one pivot axis, the pivot axis running transverse, in particular perpendicular, to the first axis. Particularly preferably, the joint device enables a pivoting about two such pivot axes that are configured perpendicular to each other. If the first axis is designated as Z axis, then the ball joint enables a pivoting about at least one, and preferably two, independent pivot axes in the X-Y plane.

In the context of the present invention, it is proposed that the receptacle segment includes at least one ramp region, the ball segment being displaceable from a normal position in a transverse direction to the first axis into a compensating position, so that the joint device forms a plunge joint.

In the context of the present invention, two functions are thus combined in the joint device, both a pivot movement and a linear displacement movement being enabled by the same joint device. Through the integration of the two functions in a single joint device, the compensating device can be simplified and/or made more compact, and in particular can be realized with fewer bearing points configured sequentially one after the other, compared to the existing art. Thus, the combination of the two functions is a new design for such a compensating device.

In a preferred example embodiment of the present invention, the ramp region is fashioned as a cone segment running completely or at least partly around a mid-axis. The mid-axis is particularly preferably oriented identical with or parallel to the first axis. For the case in which the ramp region is realized as a completely circumferential cone segment, a displacement movement of the ball segment relative to the receptacle segment can take place in any direction perpendicular to the mid-axis, in that the ball segment runs along the cone segment in the radial direction to the mid-axis as transverse direction. However, it is also possible to block particular directions by realizing the cone segment so as to be only partly circumferential. For example, the cone segment can extend only over 180° about the mid-axis, the ball segment being capable of displacement only along the cone segment in the transverse direction. In a preferred example embodiment, the cone segment is fashioned as a conical segment, in particular a right conical segment.

It is also possible for the receptacle segment to be fashioned such that a pivot movement is not possible about two pivot axes configured perpendicular to each other, but rather that this pivot movement is blocked in particular pivot directions by the shape of the receptacle segment.

In a preferred example embodiment of the present invention, the compensating device includes a pre-tension device for pre-tensioning the joint device. The pre-tension device and/or the pre-tensioning is realized such that the ball segment is guided from the compensating position back to the normal position. The pre-tensioning device can be realized in one piece or in a multi-part design.

In a preferred example embodiment of the pre-tensioning device, this device is fashioned such that the joint partners are placed under pre-tension relative to each other, in the direction of the first axis. Here it can be provided that exactly one of the joint partners, or both joint partners, are pre-tensioned in the direction of the first axis. The ramp segment is preferably shaped such that the transition of the ball segment from the normal position to the compensating position takes place against the pre-tension or against the pre-tensioning force. In particular, the ramp segment is shaped such that the transition of the ball segment from the normal position to the compensating position results in an enlargement of the overall length of the joint device in the direction of the first axis. Through this design, it is achieved that after the deflection into a compensating position for a tolerance compensation, the joint device, and thus the compensating device, are automatically guided back into the normal position.

In an example embodiment, the pre-tension device, or a part of the pre-tension device, is, for example, fashioned as a pressure spring that loads one of the joint partners in the direction of the other joint partner, and at the same time in the direction of the first axis, with a pressure force as pre-tensioning force, so that this joint partner is pressed onto the other joint partner.

The compensating device realized in this way can, as already explained, compensate position tolerances introduced via the end effector. In many operating situations, however, it is advantageous for such a tolerance compensating function to be deactivated. In particular, in many operating situations it is advantageous for the compensating device to be set to be rigid relative to only one, to some, or to all of the degrees of movement freedom. Taking into account these operating situations, the compensating device preferably has at least one locking device for locking at least one degree of movement freedom between the first and the second interface segment. The locking device can for example be actuated manually. However, it is preferred that the locking device can be activated in controlled fashion, so that it can be activated and deactivated for example by a control signal.

In a preferred example embodiment of the present invention, the locking device locks the pre-tensioning device. Through the locking of the pre-tensioning device, it is at least achieved that an enlargement of the overall length of the joint device is prevented, so that as a consequence the joint device, as plunge joint, is blocked. For the case in which a plurality of joint devices are used and the pre-tensioning device is blocked for all the locking devices, in addition the joint devices, as ball joints, are likewise set rigid. The locking device thus enables an easy realization of a rigid setting of the compensating device.

In a preferred example embodiment of the present invention, the compensating device has at least, or exactly, three of the joint devices. Particularly preferably, the at least three joint devices are situated on a common reference circle. The reference circle is situated in particular in a radial plane to the first axis. Due to the fact that each of the at least, or exactly, three joint devices is fashioned as a ball plunge joint, there result three translational and three rotational degrees of movement freedom. Thus, the compensating device can carry out a tolerance compensation in every spatial direction.

In a preferred example embodiment of the present invention, the first joint partner is displaceably pre-tensioned with the first interface segment via the pre-tensioning device in the direction of the second joint partner, and the second joint partner is fixedly connected to the second interface segment.

So that the first and second joint partners cannot separate, it is preferred that the second joint partner, in the normal position, is supported on a support region of the first interface segment, in the direction of the first axis. If the joint device is used as a plunge joint, the second joint partner is displaced in the transverse direction along the support region. If it is used as a ball joint, the second joint partner is tilted relative to the support region.

In a preferred example embodiment of the present invention, the at least one locking device includes a locking ring that has locking segments and open segments in a circumferential direction. In particular, the locking segments are made thicker, in the direction of the first axis, then the open segments. The locking ring is preferably positioned coaxial to the reference circle, and is configured so as to be rotatable and/or pivotable. The locking ring can be changed over between a locking position and a release position by pivoting. In the locking position, the locking segments lock the joint devices and/or the pre-tensioning device. In particular, in the locking position the locking segments are situated congruently, in the direction of the first axis, with the joint devices. In the release position, the open segments of the locking ring release the joint devices, or the pre-tensioning device. In particular, in the release position the open segments are situated so as to be congruent with the joint devices. For the case in which the compensating device has exactly three joint devices, the compensating device has three locking segments on the locking ring, which are offset by 120° to one another, just as the joint devices are. Between the locking segments, the open segments are positioned, also with a 120° offset, so that the locking device can be changed over by pivoting or rotating the locking ring.

In a preferred example embodiment of the present invention, the locking device includes a motor for pivoting the locking ring. For example, the locking ring can include a radially inward-oriented toothing in which there engages a gear that is connected to the motor in geared fashion, so that the pivot movement can be introduced to the locking ring.

In example embodiments of the present invention, the locking device includes additional, or other, locks, such that in the locking position the locks lock at least one degree of movement freedom of the compensating device.

Example embodiments of the present invention are directed to a handling device including a manipulator and an end effector, the compensating device, as described above, being situated between the manipulator and the end effector.

Further features, advantages, and effects of the present invention result from the following description of preferred exemplary embodiments of the present invention, and from the accompanying figures, in which corresponding parts and quantities are provided with corresponding reference characters.

BRIEF DESCRIPTION OF THE DRAWINGS

FIG. 2 is a highly schematized representation of the compensating device of FIG. 1, according to an example embodiment of the present invention.

FIGS. 4a-4f show six different variants of a locking device in the compensating device and/or in the joint devices of the preceding Figures, according to example embodiments of the present invention.

FIGS. 5a-5b show two magnetic locking devices in the same representation as in the preceding Figures, according to example embodiments of the present invention.

DETAILED DESCRIPTION

Figure 1:
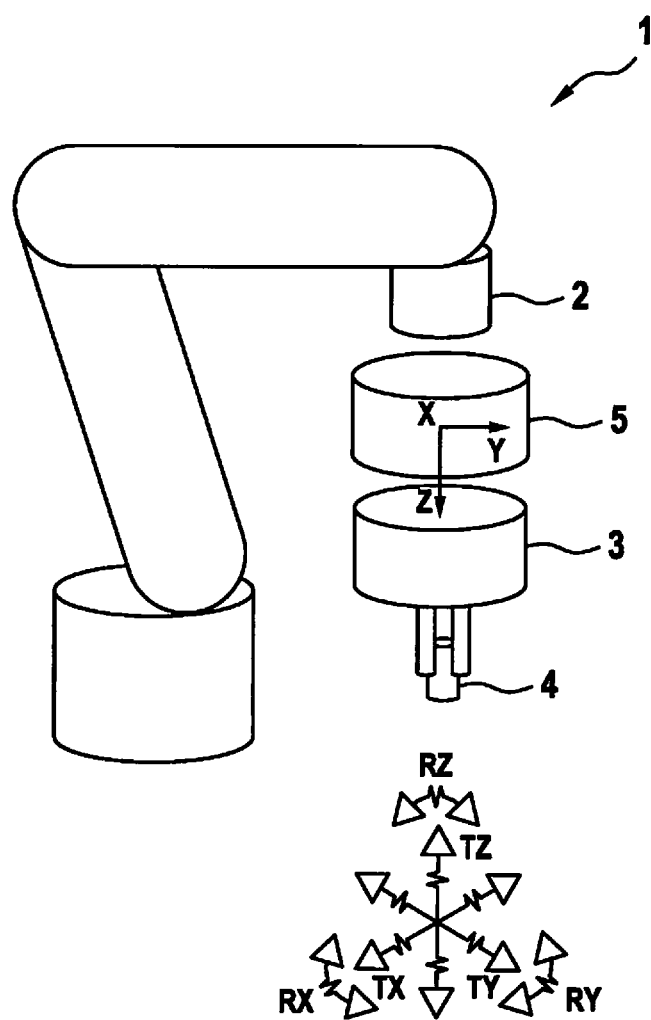
FIG. 1 is a schematic representation of a handling device having a compensating device, according to an example embodiment of the present invention.

FIG. 1 shows, in a schematic representation, a handling device 1, as is used in automation technology for picking up, putting down, and/or positioning workpieces or tools. Handling device 1 has a manipulator 2, fashioned in this example as a jointed-arm robot. In principle, manipulator 2 can be of any robotic type. Handling device 1 includes an end effector 3, realized in this example as a gripper, that holds a workpiece 4.

Between manipulator 2 and end effector 3 there is situated a compensating device 5 that is positioned sequentially or serially between end effector 3 and manipulator 2.

If a tool coordinate system 6 is considered that is situated in compensating device 5, then compensating device 5 is situated between manipulator 2 and end effector 3 in a Z direction. Perpendicular to the Z axis there runs an X axis and, at a right angle thereto, a Y axis.

Compensating device 5 makes it possible for end effector 3 to move with different degrees of movement freedom (to be configured according to the case of application) relative to manipulator 2. As can be inferred from the symbols at the bottom, in the most general realization of the exemplary embodiment movement is possible as translational movement TX, TY, TZ along the X axis, Y axis, or Z axis respectively, and in rotational degrees of movement freedom RZ, RY, RX about the X axis, Y axis, or Z axis.

A significant feature of compensating device 5 is that when workpiece 4 is gripped or positioned by handling device 1, positional tolerances can occur, between a target position and an actual position of workpiece 4 when gripping workpiece 4, or of a deposition when putting down workpiece 4. If such tolerances occur, then handling device 1 is no longer able to grip or put down workpiece 4; instead, a collision takes place. Compensating device 5 permits a relative movement between end effector 3 and manipulator 2, so that in the context of this relative movement, in particular relative displacement and/or relative rotation, end effector 3 can automatically adjust to the position of workpiece 4 when gripping, or to a depositing position when putting down.

FIG. 2 shows compensating device 5, again in highly schematized fashion. It can be seen that this device includes a first interface segment 7a on a side facing manipulator 2, and includes a second interface segment 7b on a side facing end effector 3. In the depicted exemplary embodiment, interface segments 7a, b are realized as flanged plates. However, in a constructive realization interface segments 7a, b can be realized for example as assemblies.

Between first interface segment 7a and second interface segment 7b there are provided three joint devices 8 that extend parallel to the Z axis. Joint devices 8 make it possible for second interface segment 7b, as a flexible interface segment, to move relative to fixed interface segment 7a according to the degrees of movement freedom TX, TY, TZ, RX, RY, RZ.

In the depicted representation, joint devices 8 are distributed on a common reference circle about a centrally running axis that is oriented identical to or parallel to the Z axis.

Figure 3A:
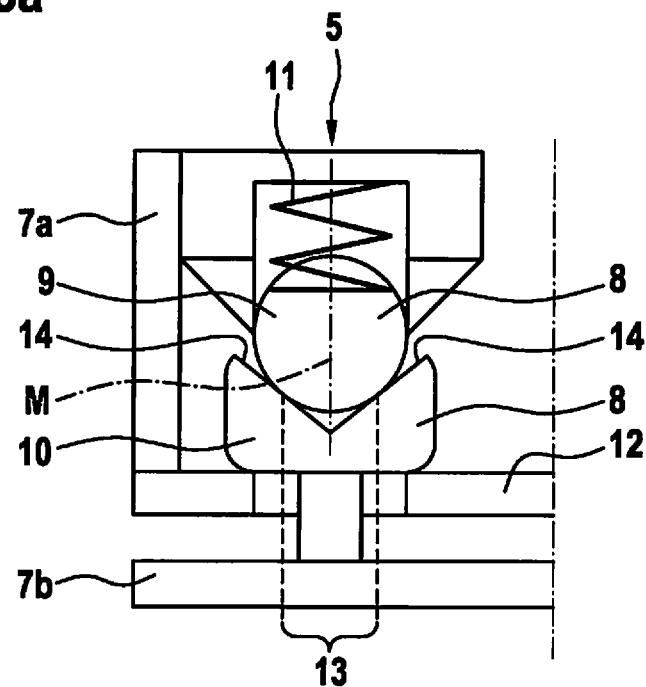
FIGS. 3a-3c show three different example embodiments of a joint device in the compensating device of the preceding Figures.
Figure 3B:
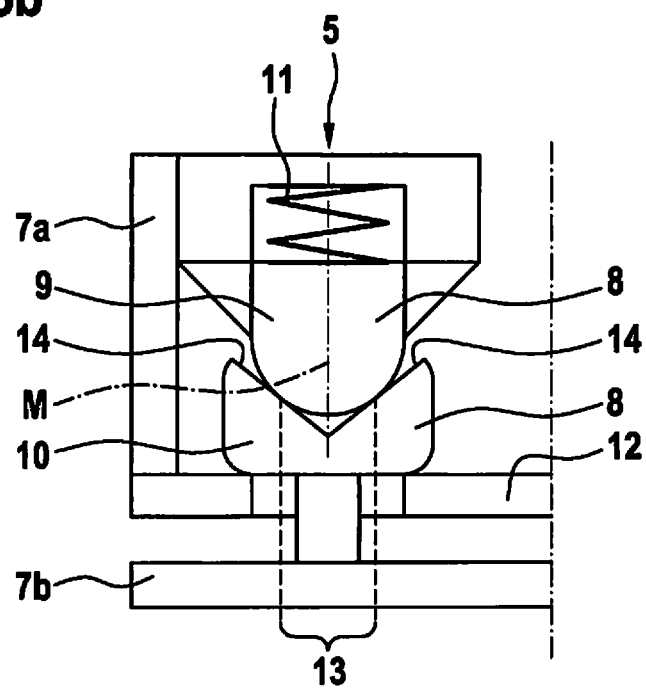
Figure 3C:
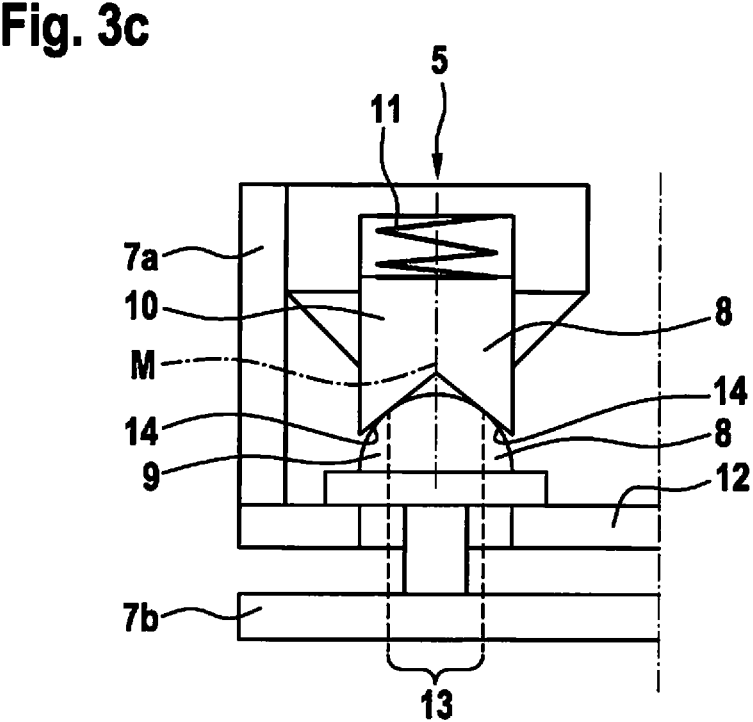

FIGS. 3a-3c each shows a possible exemplary embodiment for the realization and the integration of joint device 8 in compensating device 5.

In a highly schematized representation, again first interface segment 7a and second interface segment 7b can be seen. Joint device 8 is oriented parallel to the Z axis and includes a ball segment 9 that forms a first joint partner of joint device 8, as well as a receptacle segment 10 that forms a second joint partner of joint device 8.

In the exemplary embodiment in FIG. 3a, ball segment 9 is fashioned as a ball. Receptacle segment 10 is fashioned as a cone-shaped, in this example conical, receptacle or concave opening, receptacle segment 10 extending completely circumferentially about a mid-axis M that is oriented parallel to the Z axis. Receptacle segment 10 forms, centrically or centrally, an in particular self-centering receptacle 13 for ball segment 9, which is guided in the radial direction by the cone-shaped, in particular conical, cladding surface as a ramp region 14.

Compensating device 5 has a pre-tension device 11 that, in exemplary embodiment 3a, is fashioned as a spring device, in particular a spiral spring device, and which pre-tensions ball segment 9, in particular the ball, parallel to the Z axis in the direction of receptacle segment 10, so that ball segment 9 lies pre-tensioned against receptacle segment 10.

First interface segment 7a includes a supporting region 12 on which, in the depicted normal position, the receptacle segment 10, fashioned as second joint partner, is supported either directly or indirectly. Receptacle segment 10 as second joint partner is rigidly connected to second interface segment 7b.

Second interface segment 7b can be moved relative to first interface segment 7a, going from the normal position to a compensating position according to the degrees of movement freedom, as follows. When there is a movement of second interface segment 7b in the direction of the Z axis and/or in the direction of first interface segment 7a, pre-tension device 11 undergoes spring compression, so that a degree of movement freedom TY is provided. When there is a movement of second interface segment 7b in the Y direction, receptacle segment 10 and/or the second joint partner are displaced on supporting region 12, ball segment 9 being pressed, against the pre-tension force of pre-tension device 11, in the direction of first interface segment 7a. In this way, a degree of movement freedom TY is possible. Through the cone-shaped, in particular conical, realization of receptacle segment 10, the second joint partner and/or receptacle segment 10, and thus the second interface segment 7b connected rigidly thereto, are guided from the compensating position back to the normal position.

In the same way, the second joint partner and/or receptacle segment 10 and/or second interface segment 7b can move in the direction of the X axis relative to first interface segment 7a.

Thus, joint device 8 forms a plunge joint for degrees of movement freedom TX, TY, and TZ.

In addition, joint device 8 is fashioned as a ball joint, so that the second joint partner and/or receptacle segment 10 can be pivoted relative to the first joint partner and/or to ball segment 9, relative to the degrees of movement freedom RX, RY, RZ. In this way, second interface segment 7b can be deflected relative to first interface segment 7a, in relation to the degrees of movement freedom RX, RY, and RZ.

The named degrees of movement freedom can also be realized if compensating device 5 includes not only a single joint device 8, as shown in FIGS. 3a-3c, but rather includes, as shown for example in FIG. 2, exactly or at least three joint devices 8. In addition, a spring resetting relative to the degree of movement freedom RZ is achieved.

In order to introduce the compensating movements to compensating device 5, it can for example be provided that end effector 3 just misses workpiece 4 during gripping and, through the compensating movements, automatically moves into a position in which it can correctly grip workpiece 4.

An advantage of the exemplary embodiment in FIG. 3a is that ball segment 9, fashioned as a ball, can roll over receptacle segment 10. Receptacle segment 10 thus forms ramp region 14 for ball segment 9, and, at the transition of ball segment 9 from the normal position to a compensating position, using the plunge joint, ball segment 9 runs on ramp region 14 and, in this exemplary embodiment, rolls off.

In contrast, the exemplary embodiment of the joint device in FIG. 3b includes a ball segment 9 that is fashioned as a rounded pin that is situated in a receptacle segment 10 fashioned identically to the exemplary embodiment in FIG. 3a. An advantage of the embodiment in FIG. 3b is that ball segment 9 can be better guided in the direction of the Z axis. In contrast, given the use of ramp region 14, ball segment 9 can only be displaced and/or slide relative to receptacle segment 10, so that a higher degree of friction may arise compared to the exemplary embodiment in FIG. 3a.

FIG. 3c shows an embodiment including a kinematic reversal of the first and second joint partner compared to the exemplary embodiment in FIG. 3b; in FIG. 3c receptacle segment 10 is mounted with pre-tension and displaceably in the direction of the Z axis by pre-tension device 11 in first interface segment 7a, and in contrast ball segment 9, as second joint partner, is fixedly situated on second interface segment 7b. However, the functioning is identical to the preceding exemplary embodiments.

FIGS. 4a-4f show various variant realizations of how the degrees of movement freedom TX, TY, TZ, RX, RY, RZ can be selectively limited. Compensating device 5 includes for this purpose a respective locking device 15 that blocks particular degrees of movement freedom and thus relative movements between second interface segment 7b and first interface segment 7a. Locking devices 15 include locks that can optionally be situated in compensating device 5 in stationary fashion, or so as to be capable of being activated and deactivated. Locking devices 15 are shown only symbolically in the Figures, and illustrate the point of action of the lock.

Figure 4A:
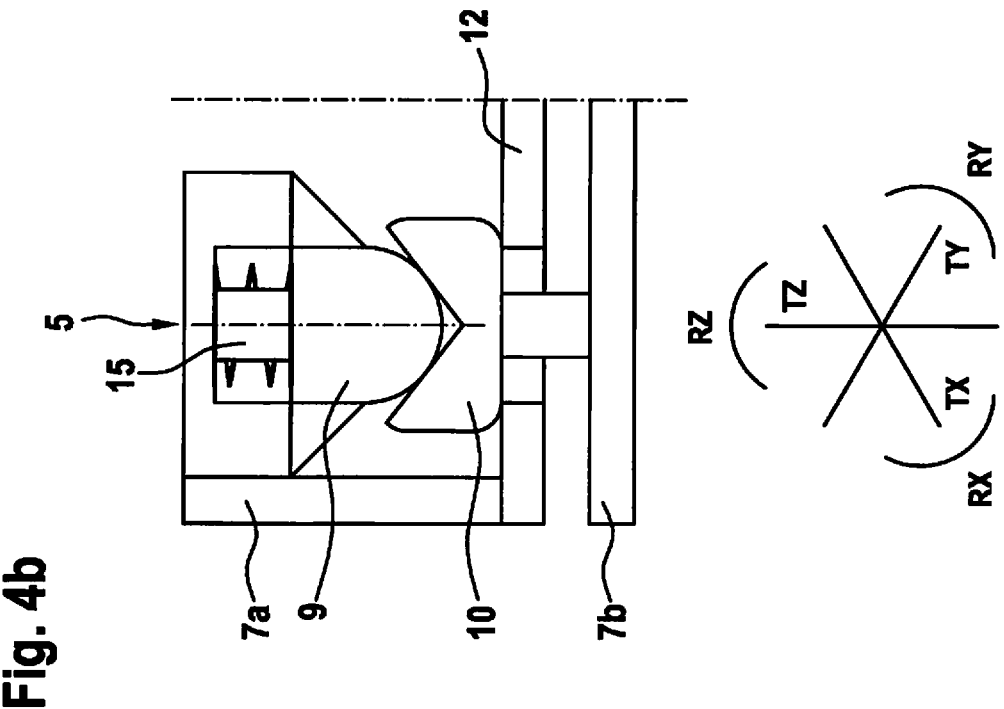

In FIG. 4a, for example a locking device 15 is situated between second interface segment 7b and first interface segment 7a, and in particular supporting region 12. Locking device 15 blocks degree of movement freedom TZ as well as degrees of movement freedom RX and RY.

Figure 4B:
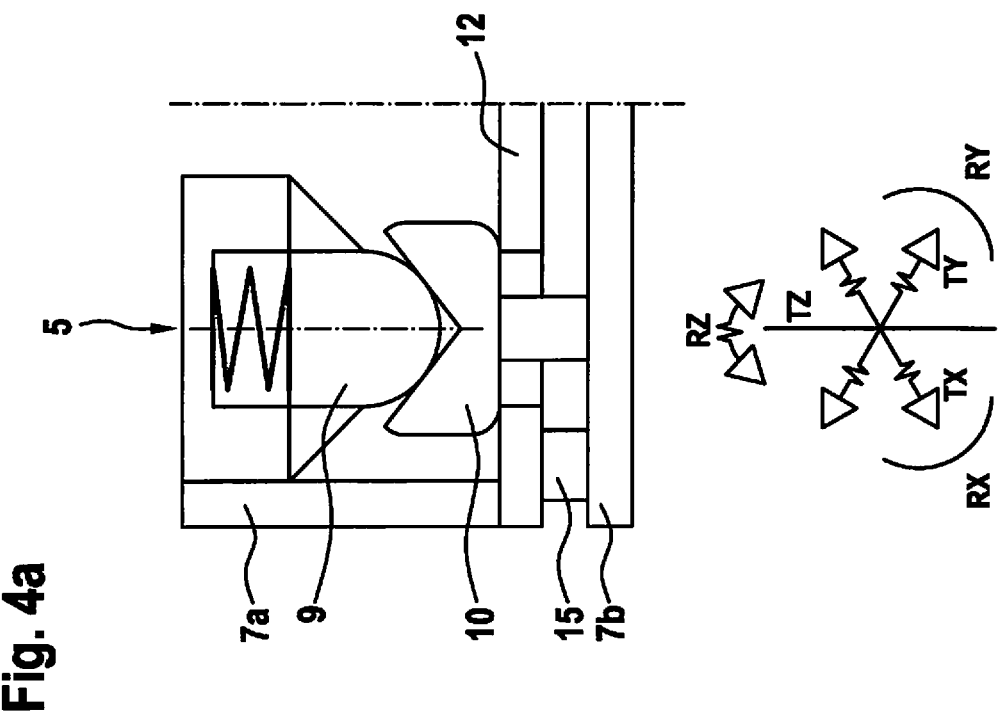

In FIG. 4b, another locking device 15 is situated in the direction of the Z axis between ball segment 9 and first interface segment 7a, b, so that pre-tensioning device 11 is blocked. This locking device 14 causes a blocking of all degrees of movement freedom TX, TY, TZ, RX, RY, RZ.

In FIG. 4c, a locking device 15 is situated between receptacle segment 10 and first interface segment 7a—acting in the direction of the Z axis—and between ball segment 9 and a side wall of first interface segment 7a, acting in the Y direction. This locking device 15 blocks degree of movement freedom TZ, as well as RX and RY.

In FIG. 4d, a locking device 15 is provided between receptacle segment 10 and a side wall of first interface segment 7a, acting in the direction of the Y axis, so that degrees of movement freedom TX and TY are blocked.

In FIG. 4e, a locking device 15 is situated between receptacle segment 10 and supporting region 12, acting in the direction of the X axis, so that degrees of movement freedom TX and TY are blocked.

In FIG. 4f, a locking device 15 is situated in a position similar to that of locking device 15 in FIG. 4a, but the device in FIG. 4f lies against second interface segment 7b with a spherical tip, so that only degree of movement freedom TZ is blocked.

While the preceding FIGS. 4a-4f have shown mechanical locking devices 15, in each of FIGS. 5a-5b a magnetic locking device 15 is shown. In FIG. 5a, a coil is integrated in ball segment 9a, and during operation this coil, as a magnet, tightens ball segment 9 with receptacle segment 10, so that degrees of movement freedom TX, TY, RX, RY, and RZ are fixed. In FIG. 5b, in contrast, a magnetic locking device is situated in receptacle segment 10, so that during activation all degrees of movement freedom are blocked. In particular, on the one hand receptacle segment 10 is magnetically sealed with ball segment 9, and in addition receptacle segment 10 is magnetically sealed with support region 12, as part of a plate.

Figure 6:
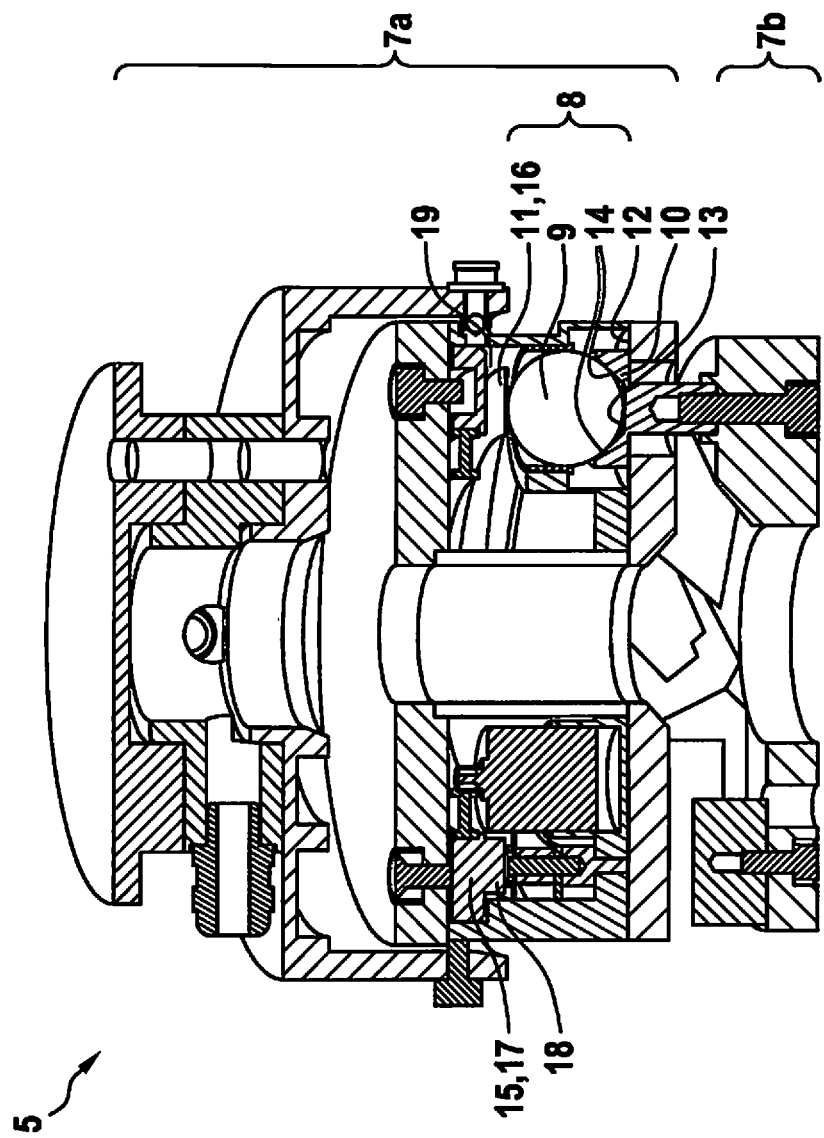
FIG. 6 shows a second example embodiment of a compensating device in a schematic sectional representation, parallel to a Z axis of the compensating device.

FIG. 6 shows a schematic sectional view of an example embodiment of compensating device 5 as a further exemplary embodiment of the present invention. Compensating device 5 again includes a first interface segment 7a and a second interface segment 7b, each formed as an assembly. Extending in the direction of the Z axis, three joint devices 8 are situated at regular distances from each other on a common diameter of a common reference circle, in the circumferential direction. In particular, these are offset by 120° to one another. In first interface segment 7a there is situated a ball segment 9, fashioned as a ball, situated so as to be capable of displacement in the direction of the Z axis. A function of pre-tension device 11 is carried out by a circumferential plate spring 16 that is situated coaxial to the reference circle and extends in a radial plane to the Z axis. Through a displacement of ball segment 9, fashioned as a ball, in the direction of the Z axis (upward in FIG. 6), the pre-tension force produced by pre-tension device 11 is increased. Ball segment 9 again forms the first joint partner.

The second joint partner, again fashioned as a receptacle segment 10, is fixedly connected to second interface segment 7b, and lies on supporting region 12 with its lower side. The second joint partner extends through support region 12, a through-opening in the direction of the X axis and Y axis being made so large that a relative displacement is possible in the TX and TY direction.

Figure 7:
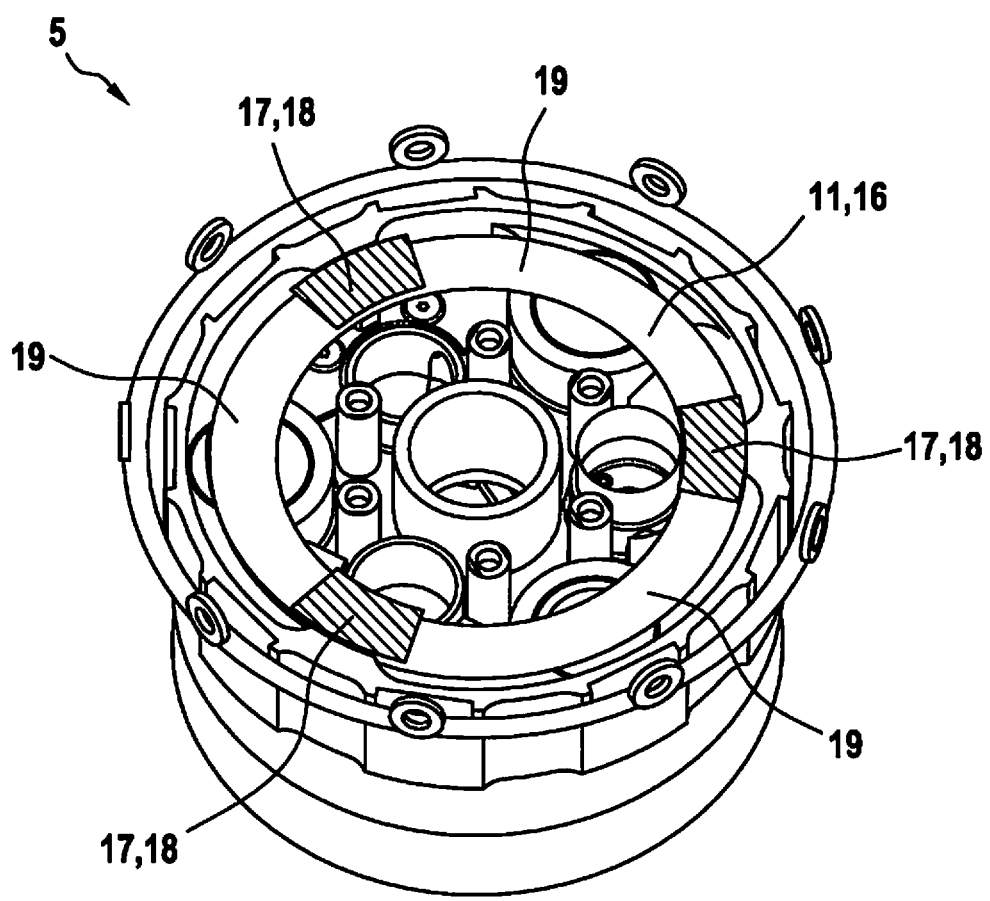
FIG. 7 shows a schematic sectional representation of the compensating device of FIG. 6, in a sectional plane perpendicular to the Z axis, according to an example embodiment of the present invention.

In FIG. 7, compensating device 5 of FIG. 6 is shown in a schematic cross-section in a radial plane perpendicular to the Z axis, the sectional plane running in the region of pre-tension device 11 or plate spring 16. Also indicated graphically, and to be understood in connection with FIG. 6, a locking ring 17 is shown that has locking segments 18 that are fashioned as thickened parts in the direction of the Z axis. Open segments 19 are shown between locking segments 18. In FIG. 6, on the right side a locking segment 18 is shown, and (made significantly narrower in comparison thereto in the direction of the Z axis) an open segment 19 is shown. In FIG. 7, open segments 19 are shown only as reference characters.

In the release state of locking device 15 shown in FIG. 7, open segments 19 coincide with ball segments 9, so that these segments can be displaced in the direction of the Z axis. If locking ring 17 is moved further in the circumferential direction, so that locking segments 18 are situated so as to be congruent with ball segments 9 in the direction of the Z axis, then pre-tension device 11 and/or ball segments 9 are blocked with regard to a movement in the direction of the Z axis. In other words, ball segments 9 are locked in the direction of the Z axis, as is shown schematically in FIG. 4b.

For clarity, it is again noted that in FIG. 4b locking device 15 is situated parallel to pre-tension device 11, and in FIG. 6 pre-tension device 11, realized as plate spring 16, lies immediately on ball segment 9, and locking ring 17 is situated serially and/or sequentially thereto.

Figure 8:
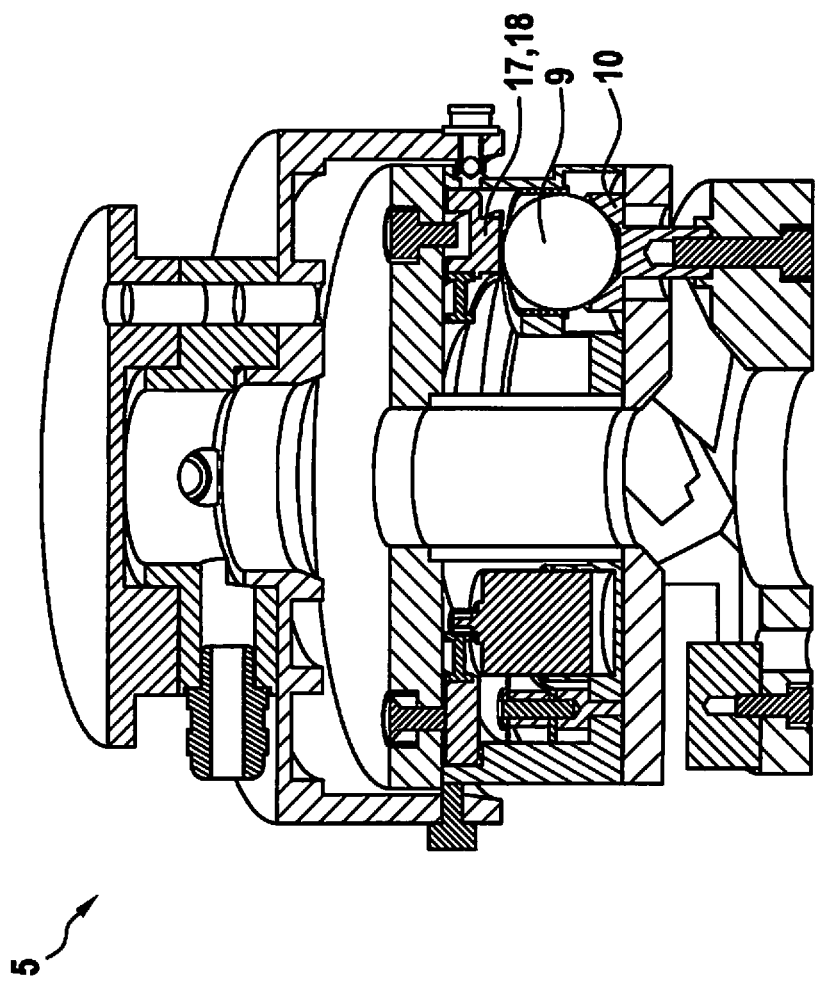
FIG. 8 shows the compensating device of FIGS. 6 and 7, in the same representation as in FIG. 6, in a locking state, according to an example embodiment of the present invention.

In FIG. 8, compensating device 5 is shown in the same representation as in FIG. 6, and, in comparison thereto, locking ring 17 is in the locked position. Thus, ball segment 9 cannot be deflected in the direction of the Z axis (upward), so that all the degrees of movement freedom of compensating device 5 are blocked.

Figure 9:
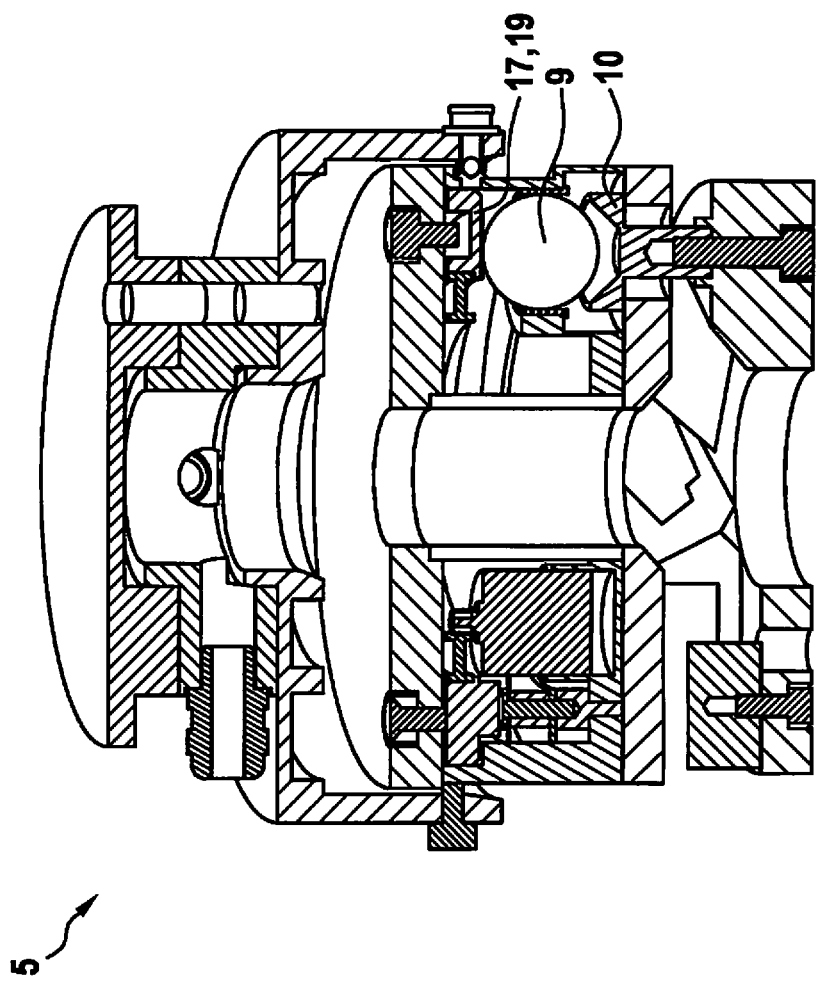
FIG. 9 shows the compensating device of the preceding Figures in the same sectional view, with a deflection in an X direction, according to an example embodiment of the present invention.
Figure 10:
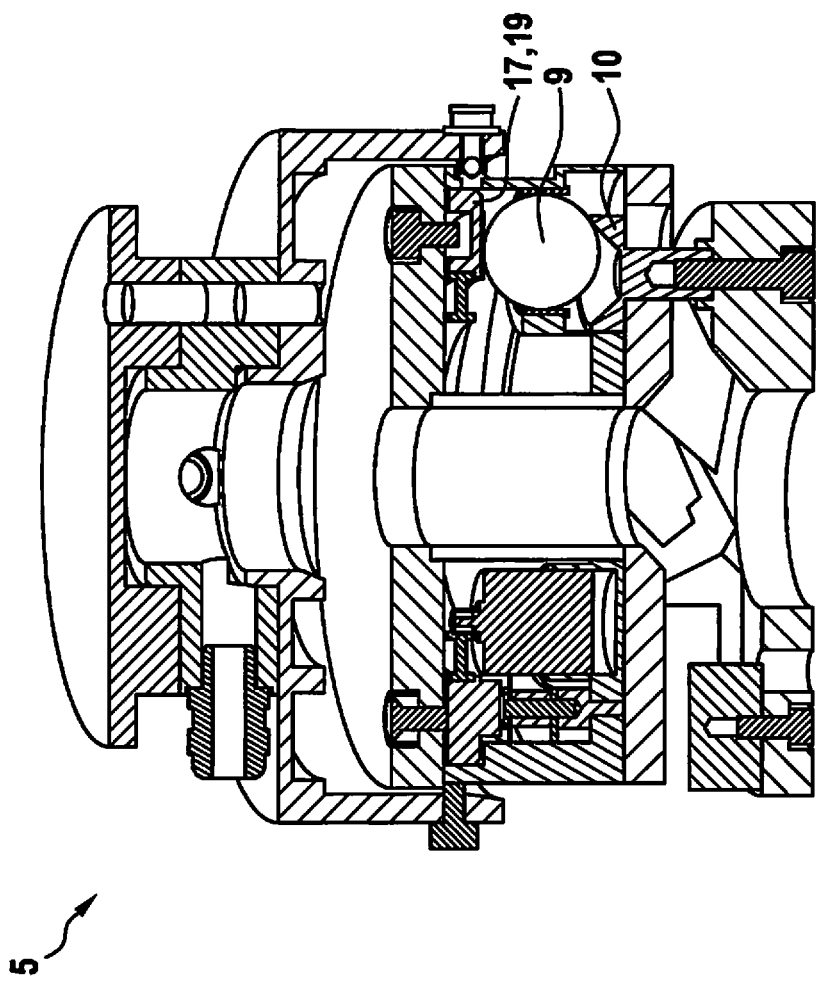
FIG. 10 shows the compensating device in the same sectional representation as in the preceding Figures, with a deflection in the Y direction, according to an example embodiment of the present invention.
Figure 11:
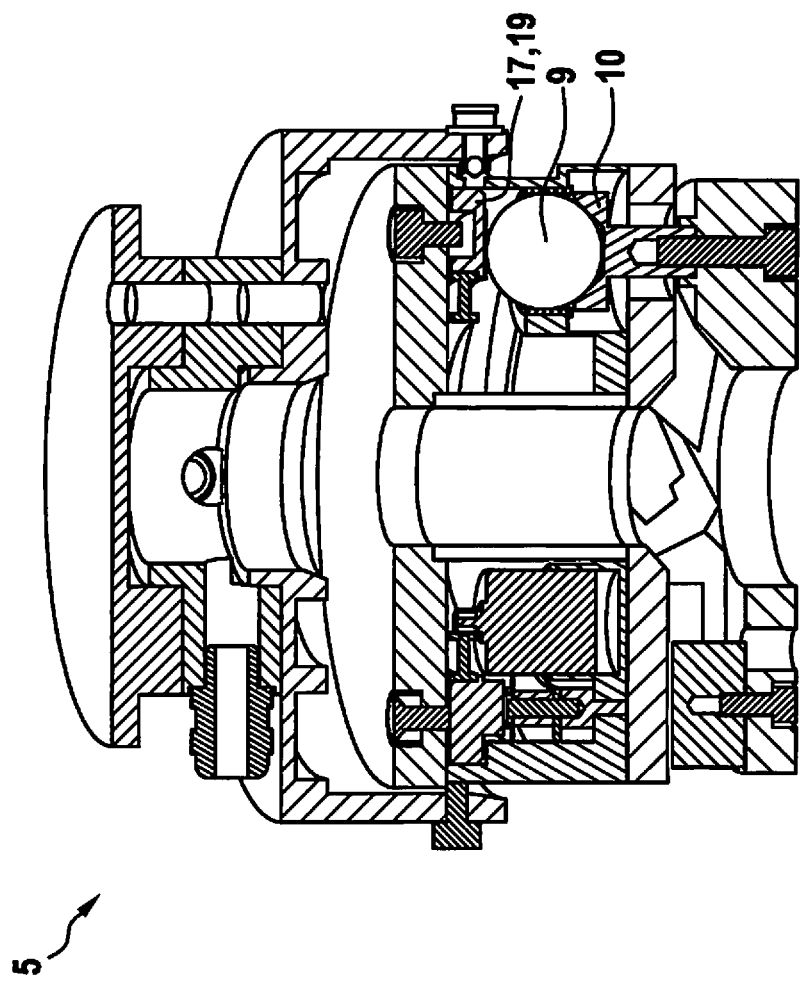
FIG. 11 shows the compensating device of the preceding Figures, with a deflection in the Z direction, according to an example embodiment of the present invention.

FIG. 9 shows locking ring 17 again in a release position, second interface segment 7b being displaced relative to first interface segment 7a in the TX direction. Through the displacement, ball segment 9 has run onto ramp region 14, in the direction of the X axis, of receptacle segment 10, causing ball segment 9 to be displaced in the direction of the Z axis. Through this displacement of ball segment 9, on the one hand the displacement movement in the TX direction is realized. On the other hand, plate spring 16 and/or pre-tension device 11 are deformed in such a way that the pre-tension force is increased and compensating device 5 is thus pre-tensioned in such a way that it again seeks to return to the normal position according to the preceding Figure. In FIG. 10, a relative displacement in the TY direction is shown, and the running of ball segment 9 along ramp region 14 can again be seen clearly. In FIG. 11, in contrast a displacement in the direction of the Z axis can be seen.

The displacements in the RX, RY, and RZ directions can be realized through a relative pivoting of second interface segment 7b relative to first interface segment 7a.

What is claimed is:

1. A compensating device for positioning between a manipulator of a handling device and an end effector of the handling device, comprising:

a first interface segment configured to connect to the manipulator;

a second interface segment configured to connect to an end effector;

at least one joint device oriented in alignment with a first axis between the first and second interface segments, wherein the first axis is perpendicular to a line in a Y direction defined by passing through a radial center of each of the first interface segment and the second interface segment;

a first joint partner connected to the first interface segment and a second joint partner connected to the second interface segment; and at least one locking device configured to lock at least one degree of movement freedom between the first and second interface segments;

wherein one of the first and second joint partners is a ball segment and the other of the first and second joint partners is a receptacle segment for the ball segment, so that the joint device forms a pivot joint or ball joint, wherein the receptacle segment includes at least one ramp region, wherein the ball segment is displace-able, from a normal position, in a transverse direction to the first axis into a compensating position, so that the joint device forms a plunge joint, wherein when there is a movement of the second interface segment in the direction of a Z axis and/or in the direction of the first interface segment, a pre-tension device undergoes spring compression, so that a degree of movement freedom is provided, and when there is a movement of the second interface segment in the Y direction, the receptacle segment and/or the second joint partner are displaced on a supporting region, the ball segment being pressed, against the pre-tension force of the pre-tension device, in the direction of the first interface segment, so that a degree of movement freedom is provided, and wherein the pre-tension device is for pre-tensioning the joint device, so that the ball segment is guided from the compensating position back into the normal position, wherein the locking device is configured to lock the pre-tension device.

2. The compensating device of claim 1, wherein the ramp region is configured as a conical segment running completely or at least partly around a mid-axis that is co-axial with or parallel to the first axis.

3. The compensating device of claim 1, wherein the pre-tension device is for pre-tensioning the joint device, so that the ball segment is guided from the compensating position back into the normal position.

4. The compensating device of claim 3, wherein the pre-tension device sets the first and second joint partners into pre-tension with each other in a direction of the first axis, the ramp segment being shaped such that the transition of the ball segment from the normal position into the compensating position takes place against the pre-tension.

5. The compensating device of claim 3, wherein the first joint partner with the first interface segment is pre-tensioned via the pre-tension device so as to be capable of displacement in the direction of the second joint partner, and the second joint partner is fixedly connected to the second interface segment, the second joint partner being supported, in the normal position, on the supporting region of the first interface segment.

6. The compensating device of claim 1, wherein the at least one joint device is at least three of the joint devices, which are situated on a common reference circle and positioned between the first and second interface segments.

7. The compensating device of claim 1, further comprising:
   at least one locking device to lock at least one degree of movement freedom between the first and second interface segments; and
   a locking ring that includes locking segments and open segments, the locking ring being capable of being brought into a locking position, in which the locking segments lock at least one of the joint devices and the pre-tension device, and a release position, in which the open segments release the at least one of the joint devices and the pre-tension device.

8. The compensating device of claim 7, wherein the locking device includes a motor for pivoting the locking ring.

9. A handling device, comprising:
   a manipulator;
   an end effector;
   a compensating device arranged between the manipulator and the end effector;
   a first interface segment connected to the manipulator;
   a second interface segment connected to the end effector;
   at least one joint device oriented in alignment with a first axis between the first and second interface segments, wherein the first axis is perpendicular to a line in a Y direction defined by passing through a radial center of each of the first interface segment and the second interface segment; and
   a first joint partner connected to the first interface segment and a second joint partner connected to the second interface segment; and
   at least one locking device configured to lock at least one degree of movement freedom between the first and second interface segments;
   wherein one of the first and second joint partners is a ball segment and the other of the first and second joint partners is a receptacle segment for the ball segment, so that the joint device forms a pivot joint or ball joint,
   wherein the receptacle segment includes at least one ramp region,
   wherein the ball segment is displace-able, from a normal position, in a transverse direction to the first axis into a compensating position, so that the joint device forms a plunge joint,
   wherein when there is a movement of the second interface segment in the direction of the Z axis and/or in the direction of the first interface segment, a pre-tension device undergoes spring compression, so that a degree of movement freedom is provided, and when there is a movement of the second interface segment in the Y direction, the receptacle segment and/or the second joint partner are displaced on a supporting region, the ball segment being pressed, against the pre-tension force of the pre-tension device, in the direction of the first interface segment, so that a degree of movement freedom is provided, and
   wherein the pre-tension device is for pre-tensioning the joint device, so that the ball segment is guided from the compensating position back into the normal position, wherein the locking device is configured to lock the pre-tension device.

* * * * *